(12) United States Patent
Carkner

(10) Patent No.: US 9,083,065 B2
(45) Date of Patent: Jul. 14, 2015

(54) SELF HEATING BATTERY SYSTEM

(75) Inventor: Steve Carkner, Ottawa (CA)

(73) Assignee: Revision Electronics & Power Systems Incorporated, Luxembourg (LU)

( * ) Notice: Subject to any disclaimer, the term of this patent is extended or adjusted under 35 U.S.C. 154(b) by 817 days.

(21) Appl. No.: 13/388,659

(22) PCT Filed: Jul. 29, 2010

(86) PCT No.: PCT/IB2010/053441
§ 371 (c)(1),
(2), (4) Date: Feb. 2, 2012

(87) PCT Pub. No.: WO2011/015974
PCT Pub. Date: Feb. 10, 2011

(65) Prior Publication Data
US 2012/0126753 A1     May 24, 2012

Related U.S. Application Data

(60) Provisional application No. 61/230,727, filed on Aug. 2, 2009.

(51) Int. Cl.
*H02J 7/00* (2006.01)
*H01M 10/615* (2014.01)
*H01M 10/637* (2014.01)
*H01M 10/667* (2014.01)

(52) U.S. Cl.
CPC ...... *H01M 10/5006* (2013.01); *H01M 10/5026* (2013.01); *H01M 10/5097* (2013.01)

(58) Field of Classification Search
USPC ........................................................ 320/129
See application file for complete search history.

*Primary Examiner* — Edward Tso
*Assistant Examiner* — Robert Grant
(74) *Attorney, Agent, or Firm* — MU Patents; Timothy Marc Shropshire

(57) ABSTRACT

A battery self heating system for batteries that experience battery impedance or internal battery resistance when temperature drops. The system comprises an energy storage element applied to the battery terminals to draw energy from the battery. The energy is stored in a magnetic or capacitive storage device. The system is self-resonant so that energy transfer from the storage device to the battery will occur at a frequency and load level that is compatible with the current state of the battery. Internal heating of the battery is accomplished by a cycle comprising the out flux and influx of energy through the impedance of the battery. Energy losses due to battery impedance are converted to heat thereby heating the battery internally.

17 Claims, 1 Drawing Sheet

100

100

200

SELF HEATING BATTERY SYSTEM

CROSS-REFERENCE TO RELATED APPLICATIONS

The present application claims priority to International Application No. PCT/IB2010/053441 filed on Jul. 29, 2010, entitled "Battery Self Heating System", which claims benefit of U.S. Provisional Patent Application No. 61/230,727 filed on Aug. 2, 2009, the entire disclosures of which are incorporated by reference herein.

TECHNICAL FIELD

This invention relates to batteries and specifically to a battery self heating system.

BACKGROUND OF THE INVENTION

Many battery technologies have difficulty when operating at very low temperatures. Of particular concern are applications such as cold weather engine starting. In such conditions the ability of the battery system to deliver high cranking amps at very cold temperatures is crucial but inherently limited in chemical batteries.

A number of inventions address the fundamental issue of cold batteries by teaching a variety of ancillary heating systems such as those that are wrapped around the battery like a blanket or placed below the battery like a warming plate. These ancillary heating systems often rely upon an external power supply, such as household AC. Thermostatically controlled battery heaters of this type are well known. However, these types of battery heaters have a number of disadvantages when applied to gelled or solid electrolyte systems such as Lithium Polymer batteries. For example, solid electrolyte batteries cannot efficiently absorb the heat applied from an external source as efficiently as a liquid electrolyte battery can. Furthermore, external heating elements placed against the casing of a solid electrolyte batter can cause thermal stress and damage to the battery. External heating elements and their electrical connections are also very fragile and so are a major source of failure in battery heating systems.

A number of solutions have been proposed to overcome deficiencies of external battery heating systems.

One example is U.S. Pat. No. 7,327,122 'Battery Heating Circuit' issued to Kamenoff on Feb. 5, 2008 teaches a heating system that is powered by the battery itself. The battery heater is powered automatically when the battery is subjected to an external load. However, in most situations the battery needs to be warm before the load is applied so that the load can be properly supplied. In addition, the battery heater draws power from the battery which may further compromise the performance of the battery when supplying a large load in cold temperatures. For a lithium ion battery, if the battery has insufficient available capacity at low temperatures to support a load, then the terminal voltage of the battery will drop and this can severely damage the battery. A lithium cobalt battery normally operates at between 3.0 and 4.2 volts. If the terminal voltage of the cell is brought below about 2.0 volts, irreversible damage to the battery will occur.

A further example is U.S. Pat. No. 6,441,588 'Battery charging control method employing pulsed charging and discharging operation for heating low-temperature battery' issued to Yagi et al on Aug. 27, 2002. Yagi proposes a system that alternately applies an external load to a cold battery followed by an external charging pulse. This alternate loading and charging cycle heats the battery. The Yagi system is useful when a battery needs to be charged rapidly in cold temperatures. However, this system is not effective when a battery must be discharged in cold temperatures such as in an engine cold start. Externally loading the battery to heat it results in wasted energy.

Another example is U.S. Pat. No. 6,882,061 'Battery self-warming mechanism using the inverter and the battery main disconnect circuitry' issued to Ashianti et al on Apr. 19, 2005. Ashianti teaches the use of a split battery bank and motor driver to effectively convert DC to AC to DC as a means for warming the battery. However, this system is too cumbersome to implement inside the battery casing and must be mounted externally.

A further example is U.S. Pat. No. 6,072,301 'Efficient resonant self-heating battery electric circuit' issued to Ashianti et al on Jun. 6, 2000. This patent teaches a four step process: transferring energy from the battery to an inductor; then to a capacitor; then back to the inductor; then back to the battery. This is a complicated process which requires additional components which are not well suited for installation within the battery casing. Energy is transferred by a single switch to an energy storage element, and is then transferred back into the battery through the same switch. The body of the patent discloses a system based on the resonant characteristics of an inductor and capacitor being operated in a tuned fashion at very high power. The four step energy transfer process will suffer from poor efficiency, especially at high power levels. Large batteries have very low impedance, even when they are cold, the result is that most of the heat generated by this system will be lost in the inductor and capacitor, rather than inside the battery cells, which is where it is needed. The capacitor will also suffer from severe degradation at low temperatures and will itself need to be heated in order to work efficiently in this system.

A resonant system based on a combination of capacitors and inductors will also require more components than necessary. The use of two separate energy storage elements, a capacitor and inductor, will add significant weight and size to the end product and may preclude the warming circuit being enclosed within the battery housing itself.

There exists a need for a battery self warming circuit that requires fewer or smaller energy storage elements that can be operated in a manner that ensures maximum heat generation inside the battery cells, rather than inside the self-heater driving circuitry.

Prior art resonant systems rely upon the operation of energy transfer circuits that are connected to the battery. These circuits used are resonant circuits composed of inductors and capacitors having a fundamental frequency defined by the circuit elements themselves. There remains a need for a battery heating system that can efficiently heat a battery without an external energy source.

There also a need for a battery heating system that can use the battery's own energy without damaging the battery by overloading it at cold temperatures. There is also a need for a battery heating system that does not use a discrete heater element.

There is a need for a resonant circuit that is governed by the state of the battery itself, the individual cells and the current and voltage profile of those cells when subjected to a load.

SUMMARY OF THE INVENTION

In accordance with the present invention there is provided a battery self heating system to be used on battery systems that experience an increase in battery impedance or internal battery resistance when temperature drops. Such systems include rechargeable lithium batteries, rechargeable alkaline batteries, lead-acid batteries and nickel cadmium batteries. In one embodiment of the invention an energy storage element is applied to the battery terminals to draw energy from the battery. The energy is stored in a magnetic or capacitive storage device. The system of the invention controls the storage device so that energy is directed back into the battery with minimal conversion losses. The system of the invention is capable of monitoring both the temperature, voltage and current of the battery pack. In a preferred embodiment of the invention the battery self heating system is self-resonant. The energy transfer from the storage device to the battery will operate at a frequency and load level that is compatible with the current state of the battery. Internal heating of the battery is accomplished by a cycle comprising the out flux and influx of energy through the impedance of the battery. If an amount of energy Y is transferred by the battery self heating system and the system has an efficiency of X (where X includes losses from electronics, interconnections and the battery itself), then an amount of energy calculated as $Y*X$ will be preserved on each cycle and an amount of energy calculated as $(Y-Y*X)$ will be converted to heat. The colder the battery the higher the battery impedance resulting in a higher value for $(Y-Y*X)$ that is converted to heat. In one embodiment of the invention the energy transfer from battery to storage device is designed so that the majority of the transfer losses are dependent upon the impedance of the battery rather than a measure of the efficiency of the self heating system as determined by losses from electronics and interconnections of the system. The impedance losses can be several magnitudes larger than the efficiency losses at cold temperatures. Therefore, large amounts of heat can be generated by reliance upon battery impedance. Since the heat is generated from within the battery the present invention is extremely efficient at heating the battery. In one embodiment of the invention, the self-resonant heating system is enabled when the temperature of the battery is below a threshold where the impedance of the battery is too high to reliably support the expected loads (such as engine starting).

In another embodiment of the invention the energy storage device is an inductor that magnetically stores energy. The battery terminals are connected to the inductor terminals by a switching circuit. The magnetic energy will build up inside the inductor at the same time as the current increases in the inductor and the terminal voltage of the battery drops. The inductor is disconnected when either the battery terminal voltage falls below a preset threshold or when the current through the inductor exceeds a preset threshold. This protects the battery from damage due to over discharge. The switching and inductor system is protected from excessive current because as the battery becomes warmer it can supply more energy to external loads. Once the battery terminals are disconnected from the inductor, the magnetic field collapse which causes the voltage at the output of the inductor to rapidly change. At this time the inductor is then switched to the terminals of the battery so that the magnetically stored energy is delivered back into the battery. The inductor will then be reconnected to the battery terminals to store energy and the cycle repeats. The rate at which the cycle repeats is controlled by the battery's ability to supply energy to the inductor. The higher the energy delivering ability of the battery the higher the switching rate. The switching rate is limited by the inductor value.

In a further embodiment of the invention a digital, analog or hybrid microcontroller circuit can control the switching frequency or duty cycle of the system based on known battery parameters such as the temperature and known performance of the battery at those temperatures. In this way a simplified system can be constructed that does not require measurement of the battery voltage or current, but still requires significant knowledge of the battery performance to implement. Such as system will effectively heat the battery, but will not be capable of doing so at as high a rate as a system that automatically matches switching rate to the immediate state of the battery.

In one embodiment of the invention two switches are used to move energy from the battery into an inductor.

In another embodiment of the invention two switches are used to transfer the energy out of the inductor back into the battery. This eliminates the need for any intermediate storage elements.

In yet another embodiment of the invention the switching cycle is based on current or voltage drop from the battery.

In a further embodiment of the invention, the energy transfer occurs between individual cells of the battery and energy is not stored in a storage device.

DETAILED DESCRIPTION OF EMBODIMENTS OF THE INVENTION

Figure 1:
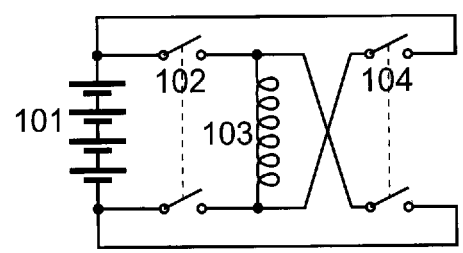
FIG. 1 is a schematic of one embodiment of the invention.

Referring to FIG. 1, there is shown one embodiment of the battery self heating system (100) comprising a battery (101) connected to a magnetic storage element (103) having first connection point and second connection point. The magnetic storage element (103) is connected to the battery (101) by means of a first double-pole-single-throw switch (102) which allows current to flow through the inductor from the first connection point to the second connection point (using a simplified positive to negative model of current flow). The first switch (102) will be opened when the current through the magnetic storage element (103) exceeds a set-point, or when the voltage at the battery (101) falls below a set-point. After the first switch (102) opens, then a second double-pole-single-throw switch (104) closes. This allows the energy in the magnetic storage element (103) to flow back into the battery (101). It is important to note that the characteristic operation of a magnetic storage element such as an inductor is such that once current flow is established in the inductor the current flow will be maintained in the same direction. It cannot instantaneously change. Therefore the first switch (102) starts current flow in a direction from positive to negative. After first switch (102) opens, current will continue to flow from positive to negative even though the circuit connecting to the inductor is open. The result will be a polarity reversal and rapid rise in the voltage across the magnetic storage element (103) which therefore can be coupled back into the battery itself by an appropriate switch arrangement. The first switch (102) may be implemented in the form of a relay, transistor, or other device capable of switching energy. The second switch (104) may be implemented in the form of a relay, transistor, diode or other device capable of switching energy or conducting energy in a fixed direction. Additionally, both switching elements (102, 104) can be combined into a single switching device such as a double-pole-double-throw relay, an integrated circuit or other device. The magnetic storage element (103) may be replaced with multiple discrete elements on each battery cell. Alternatively it may be replaced with a transformer containing multiple windings which will allow other switching structures to be implemented. In another embodiment of the invention a battery self heating system using capacitive storage elements can be constructed by arrangement of multiple capacitors into a parallel and series combinations which would allow energy to flow into and out of the capacitors as they are switched to the battery. Capacitors or inductors may also be used to store energy from a single cell or group of cells within the battery, and then deliver energy to another cell or group of cells within the battery.

Figure 2:
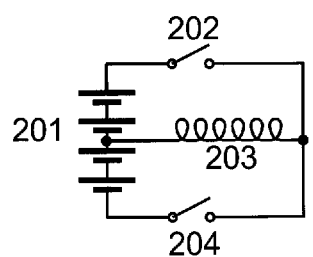
FIG. 2 is a schematic of another embodiment of the invention.

FIG. 2 shows a battery (201) that contains two groups of cells (top and bottom). The top (201a) group of cells is connected to an inductor (203) by means of a top switch (202). Current will discharge from the top cell group and flow in the inductor (203) and can be monitored or the switch may simply be operated for a pre-determined interval. When the top switch (202) is opened, the bottom switch (204) will be closed. As the magnetic field around the inductor (203) collapses, current will be forced to flow through the bottom group of cells (201B) providing charging current until the magnetic field has completely collapsed. Once the magnetic field has collapsed, the current through the inductor (203) will reverse and the bottom group of cells will now discharge into the inductor causing the magnetic field to once again build up, but in the opposite direction. As before, current, time, or another parameter can be used to determine how long to keep the bottom switch (204) closed. When the bottom switch (204) is opened, the top switch (202) will be closed, causing the magnetic field in the inductor (203) to collapse and delivering charge current into the top cells. In this manner, energy is being shuttled from the top cells to the bottom cells and from the bottom cells to the top cells with the majority of the energy losses attributed to the heat generated by the impedance of the cell groups. Such loss will be higher if the batteries are colder and therefore colder cells in the total string will generate more heat and will therefore heat up faster than the other cells. The impedance of the cells is generally very small, even when they are cold. It is therefore critical that the transfer, storage and return of energy be done with circuits that are very low impedance, preferably much lower than the cell itself. Systems that employ many-step processes, or that store the energy in external systems such as motors, will tend to lose most of the battery's energy in those elements, rather than using the energy to create self-heating. Determination of the current, voltage and other battery parameter is accomplished through appropriate sensing elements and the switches are controlled by a microcontroller, a digital, analog or hybrid circuit as is well understood in the art. Such a system is not shown here as the implementation of such a system is well understood and may take a wide variety of forms. Multiple energy storage groups may be employed which rely on the same basic concept of taking energy from the battery, or from cells within the battery, storing it, then returning it back to the battery or to other cells within the battery. The energy may be taken from one area and returned to another in a cyclic fashion, such shuttling of energy may be more efficient or easier to implement depending on the specific application and circuitry employed for the function.

A battery may be considered a single cell, a group of cells, or may also be constructed from a group of other batteries. In this way, a battery may represent any electrochemical energy storage means and is not physically constrained to a single package or construction methodology.

Although the description above contains much specificity, these should not be construed as limiting the scope of the invention but as merely providing illustrations of the presently preferred embodiment of this invention. Thus the scope of the invention should be determined by the appended claims and their legal equivalents.

The invention claimed is:

1. A battery self heating system comprising:
   a. a self-resonant circuit having a resonant frequency comprising said battery having an impedance inversely proportional to temperature,
   b. a single energy storage element comprising an inductor having an inductor value for storing an amount of energy from the battery, said inductor connected to said circuit at a positive connection point and a negative connection point by;
   c. a switch for cyclically transferring said amount of energy to and from the battery at said resonant frequency;
   d. wherein said amount of energy transferred is determined by said impedance;
   e. and wherein the resonant frequency is determined by said inductor value and said battery impedance together;
   f. and wherein an energy loss due to the impedance will be converted to heat within the battery at a rate that is at least ten times higher in the battery than in the inductor.

2. The system of claim 1 wherein the amount of energy is transferred to the battery when impedance exceeds a predetermined threshold.

3. The system of claim 1 wherein the battery has a positive terminal, a negative terminal, a low voltage set point and a high current set point.

4. The system of claim 3 wherein the inductor is isolated from the battery by said switch at said low voltage set point.

5. The system of claim 4 wherein the inductor is isolated from the battery by the switch when a current flow through the inductor exceeds an inductor high current set point.

6. The system of claim 1 further comprising a microcontroller operatively connected to the switch for controlling the switch operation based solely upon a battery temperature and independent of a battery voltage and a battery current.

7. The system of claim 1 wherein the battery is a multi-cell battery and wherein a said self resonant circuit is coupled to each single cell of said multi-cell battery.

8. The system of claim 1 wherein the switch comprises a first double-pole-single-throw switch having a first switch first pole connected to said battery positive terminal and a first switch second pole connected to said battery negative terminal so that when said first switch is open the storage element is isolated from the battery.

9. The system of claim 8 further comprising a second double-pole-single-throw switch having a second switch first pole connected to the positive terminal and a second switch second pole connected to the negative terminal.

10. The system of claim 9 wherein said first switch is open when said high current set point is exceeded and said second switch is closed thereby permitting said amount of energy to flow into the battery, wherein said amount of energy flowing into the battery will suffer an energy loss due to said impedance, and said energy loss will be converted into heat thereby warming the battery.

11. The system of claim 10 wherein the first switch is open when said voltage low set point is exceeded.

12. The system of claim 11 wherein the first switch is a relay.

13. The system of claim 11 wherein the first switch is a solid state component.

14. The system of claim 11 wherein the second switch is one of a relay, a transistor and a diode.

15. The system of claim 1 wherein the switch comprises a double-pole-double-throw relay.

16. The system of claim 1 wherein the energy storage element is a capacitor.

17. A battery self heating system for a battery comprising a pair of coupled cells, said system comprising a self-resonant circuit comprising said pair of coupled cells comprising a first cell and a second cell, wherein said cells each have an impedance that is inversely proportional to temperature, and wherein a single energy storage element comprising an inductor is connected to the first cell by a first switch and to the second cell by a second switch for cyclically transferring said amount of energy between said energy storage element and the first cell and the second cell on a cyclical basis at a resonating frequency determined by said inductor value so that energy loss due to each cell impedance will be converted to heat within the respective cell.

* * * * *